Figure 1:
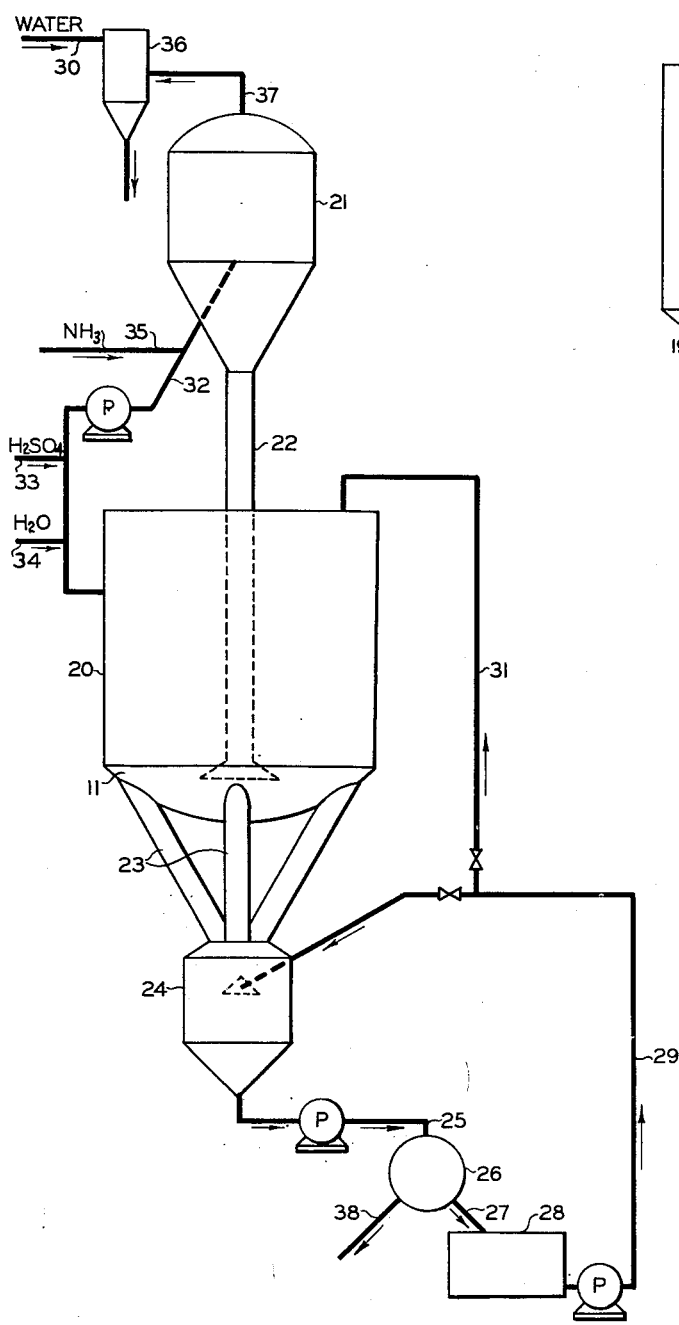

July 1, 1952

R. K. SIMMS 2,602,023

CRYSTAL MANUFACTURE

Filed Nov. 10, 1949

*INVENTOR.*
R. K. SIMMS

BY Hudson Young

*ATTORNEYS*

Patented July 1, 1952

2,602,023

UNITED STATES PATENT OFFICE 2,602,023

CRYSTAL MANUFACTURE

Russell K. Simms, Bartlesville, Okla., assignor to Phillips Petroleum Company, a corporation of Delaware Application November 10, 1949, Serial No. 126,554

13 Claims. (Cl. 23—301)

This invention relates to crystallization. In one of its more specific aspects it relates to a process and apparatus for crystallizing solid materials from liquid solutions thereof. In another specific aspect this invention relates to an improved method and apparatus for the production of crystalline salts of ammonia, such as ammonium sulfate.

In the evaporative crystallizers of the Oslo type, a saturated liquor is withdrawn from the upper portion of a crystal suspension container or crystallizer by means of a pump and is passed to an evaporator operating under subatmospheric pressures by means of a riser and suitable pump. When such a unit is used to produce crystalline materials such as ammonium sulfate from ammonia and sulfuric acid or other salts of ammonia by reaction with an acid, or other materials crystallizable from solutions, the reactants or solutions of the crystallizable material are injected into the circulating stream in the riser. A sufficient quantity of water is used when manufacturing ammonia salts such as ammonium sulfate to provide heat removal by evaporation thereby super-saturating the liquor with respect to the salt to be crystallized. The super-saturated liquor i. e., the liquor which has been evaporated until its degree of saturation is within the metastable region, is passed downwardly from the evaporation zone to the crystallization zone where it flows upwardly through a suspension of crystals. The super-saturation is released on contacting the crystals causing them to grow. The larger size crystals settle to the bottom of the crystallizer more rapidly and are withdrawn as a magma stream which is passed to a centrifuge or other suitable crystal separation means. In the more recently developed units of this type, the magma stream is withdrawn through one nozzle or drawoff line located in the bottom head of the crystal suspension container or crystallizer. A salt trap or salt leg may be affixed to the magma nozzle to provide a means for introducing recycle mother liquor to the withdrawn magma to promote circulation and to prevent salting up of the lines through which the magma is passed. Mother liquor used in this manner acts also as an elutriating agent for the crystals thus allowing the heavier ones to go down and carrying the lighter crystals back into the crystallization zone.

With the presently designed Krystal or Oslo-type crystallizer units in which all of the magma is withdrawn through one nozzle, the suspension of crystals adjacent to the withdrawal nozzle becomes relatively less dense with respect to the remainder of the suspension, and thus the super-saturated liquor is no longer distributed uniformly throughout the crystal suspension because a larger portion of this super-saturated liquor tends to flow through the less-dense crystal suspension adjacent to the withdrawal nozzle. This means that the crystals in the suspension do not grow uniformly and that the crystals withdrawn in the magma have a wider range of mesh size than desired. Furthermore, the capacity of a given unit is reduced by the channeling of the super-saturated liquor since the maximum crystal surface area is not contacted by this super-saturated liquor. In order for crystals to pass from the suspension in the area across from the withdrawal nozzle it is necessary that they move laterally across the crystallizer at the same time that liquor is passed upwardly through the crystallizer. Obviously, it is impossible to obtain uniform withdrawal of crystals under these circumstances. Furthermore, the crystals in the relatively stagnant area of the suspension have a tendency to settle to the bottom of the crystallizer and deposit on the surface thereof or form crystal agglomerates which require a shut-down of the unit for de-salting, and thus periodically the entire production of the unit must be lost for a period of about twelve hours. On large units such de-salting is required after about 140 to 200 hours of continuous operation.

The term magma used in this specification refers to a mixture of mother liquor and crystals. In this application the term refers to mixtures of saturated ammonia sulfate solution and ammonia sulfate crystals or to any solution of a crystallizable material and crystals of said material.

An object of this invention is to provide an improved process and apparatus for producing crystalline materials.

Another object of this invention is to provide a process for producing more uniform crystals.

Another object of this invention is to provide an improved process and apparatus for the manufacture of crystals of organic and inorganic compounds.

Another object of this invention is to provide an improved process for the manufacture of crystalline ammonium salts such as ammonium sulfate and ammonium nitrate.

Another object of this invention is to provide a process whereby salting up and plugging of a crystallization apparatus is reduced to a minimum.

Another object of this invention is to provide an apparatus whereby crystallization of inorganic salts from aqueous solutions is improved.

Other objects and advantages of this invention will be apparent to one skilled in the art from the accompanying disclosure and discussion.

I have discovered that the operating efficiency of an Oslo-type or other evaporative crystallizers or for that matter crystallizers using cooling as a means of crystallization, may be substantially improved by providing a more uniform withdrawal means for removing magma from the crystal suspension vessel. In accordance with my invention a crystal magma is withdrawn from a plurality of uniformly spaced points in the lower head of the crystal suspension vessel or crystalizer and thus uniformly from all areas of the crystal suspension. Thereby more even and efficient contacting of the super-saturated liquor in the crystallizer with the suspended crystals is obtained. It is usually preferred that the withdrawal points be positioned more than half the radius of the crystal suspension vessel from the center however under some circumstances it may be desirable to position them otherwise. By withdrawing magma in this manner, and avoiding channeling and uneven withdrawal of crystals, the super-saturated liquor is allowed to be uniformly distributed throughout the crystal suspension; and consequently all of the crystals in the classified suspension are subjected to relatively uniform deposition of the crystallizable material. Thus it is possible to withdraw a magma containing crystals within a relatively narrow range of mesh size. Furthermore, as the crystals settle from the crystal suspension, they are withdrawn from the vessel at a plurality of points thereby reducing the tendency to form agglomerates or deposits on the surface of the crystallizer and salting up same. With this improved method of magma withdrawal, the period of continuous operation between shut-downs for de-salting can be substantially increased.

A more detailed understanding of some of the many aspects of my invention may be had by referring to the attached drawings in conjunction with the following discussion.

Figure 2:
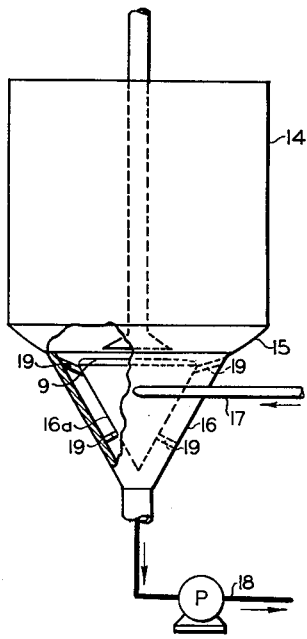

Figure 1 shows one embodiment of my invention as it may be used in conjunction with a modified Oslo type evaporative crystallizer. Figure 2 is a front elevation of a second embodiment of my invention. The flow description of Figure 1 provides one method of operating the process of my invention. However, it is understood that while this is representative in general of my process, various minor changes may be made in adapting same to the various conditions within the scope of the invention. Although this embodiment shows a cooling and reduced pressure type of crystallizer, the apparatus of my invention may be used with equal utility in conjunction with a crystallizer using only cooling to cause crystallization.

Refer now to Figure 1 which is a schematic flow diagram showing one embodiment of my invention and which further indicates how this embodiment may be used in conjunction with an Oslo-type evaporative crystallizer. Number 20 indicates a crystallizer or crystal suspension vessel into which a supersaturated solution of ammonium sulfate is passed for crystallization. Number 11 is the inverted dome shaped bottom of the crystallizer, and number 23 indicates a plurality of conduits leading from said dome shaped bottom, the locus of the upper ends of same being a circle which is in axial relationship with the bottom of the crystallizer. Conduits 23 are evenly spaced around said circle and preferably converge together at their lower ends into a single conduit. It is within the scope of my invention for these conduits to remain separated, entering the salt trap 24 at individual points. These conduits may be of any desired tubular shape such as rectangular, oval or round, the latter two shapes being the most advantageous because they provide no sharp surfaces where crystals may lodge. It is also within the scope of my invention that the outlets of these conduits pass directly to a magma line such as line 25 through which the magma is passed to suitable recovery means without first passing through a salt trap.

The supersaturated solution within vessel 20, introduced thereto by a downcomer or barometric leg 22 contacts crystals therein thus causing them to grow and thereby reducing the supersaturation of the solution. When the crystals have reached the desired size they are withdrawn from the bottom of the crystallization unit by means of the above discussed withdrawal conduits, and are passed either through salt trap 24 as indicated or directly to magma line 25. In either case, the magma is supplemented with recycled mother liquor introduced via line 29 thus providing a more fluent mass which is more easily pumped through conduits without salting up. It may be desirable to utilize recycle magma rather than mother liquor thus providing for a high rate of flow and no reduction in crystal solids content of the magma, as broadly disclosed and claimed in copending application Serial No. 126,599, filed November 10, 1949, of E. C. Ayers. The magma supplemented with mother liquor is passed from line 25 to centrifuge 26 where the crystals are separated from the mother liquor and from which these crystals are recovered. If desirable, the crystals may be washed and further treated in suitable drying apparatus to prevent agglomeration on storage. Such treatment is desirable no matter what the size and shape of the crystals may be inasmuch as a slight residue of acid thereon seems to cause the crystals to stick together more readily.

The mother liquor separated from the crystals in the centrifuge is passed by means of line 27 to liquor storage tank 28 from which it is pumped, as needed, via line 29 back to the salt trap and/or via line 31 back to the crystallization zone. Liquor, the supersaturation of which has been reduced in the crystallization zone, is recovered from the upper portion thereof and passed via line 32 to evaporator 21.

Located in line 32 are inlet conduits for fresh acid and additional water and ammonia. The acid and ammonia react on contact with each other in this line to form additional ammonium sulfate while the water is introduced to provide a means for removing heat of reaction. An alternative of introducing ammonia and sulfuric acid in this line is to merely have an inlet for ammonium sulfate liquor, such as that produced by a gypsum process, and for this reason applicant's invention is not to be limited by the method of making the ammonium sulfate solution. Water is passed through line 30 and through condenser 36 to condense the water vapor removed from the mother liquor. A steam aspirator, not shown, is used in conjunction with condenser 36 to reduce the pressure in evaporator 21 thus making the liquid therein boil. The water vapor so produced by this boiling is passed from evaporator 21 by means of conduit 37. In this manner a vacuum of about 24 to 26" of mercury may be maintained.

Refer now to Figure 2 which shows a second embodiment of my invention. The crystallizer 14 and inverted dome shaped bottom 15 thereof shown in this figure are similar to crystallizer 20 and the bottom 11 thereof shown in Figure 1. The magma withdrawal means shown in the embodiment comprises two concentric cones 16 and 16a forming an annular space therebetween through which magma is withdrawn. The closed top of cone 16a is preferably slightly concave in shape and may have a contour ring 9 around its outer edge. This ring may be of any desired shape, however, it is preferable that it be at least a quarter circle or ellipse and preferably a half circle or half ellipse fastened to the cone on its flat side, so that, in the case of the quarter circle the curved side is toward the center of the top of cone 16a. Suitable supports for the inner cone 16a such as supports numbered 19 are necessary. With this type of construction a substantially continuous annular slot is formed in the bottom head 15 of the crystal suspension vessel. The magma produced within crystallizer 14 flows through this slot and the annular space between the two cones and thence via line 18 to suitable separation and recovery means. A controlled portion of recycled mother liquor or recycled magma may be returned to the annular space between the two cones through one or more inlets such as tangential inlet 17. Such inlet means may be positioned other than tangentially, however, in many cases the tangential positioning will be the most desirable. Returning mother liquor in this manner produces some elutriation and also increases the velocity of the magma stream as it passed toward the apex of the cone thereby preventing bridging or plugging and salting up of crystals in the withdrawal lines. Recycling magma or mother liquor through line 17 as described provides a flow rate through the withdrawal lines which may be maintained considerably greater than the withdrawal rate from the crystallizer. This is apparent because only a certain withdrawal rate may be used when a particular size of crystals is desired, and when particularly large size crystals are desired it is obvious that this rate may be somewhat slower than when very small crystals such as those produced by shocking out are recovered. Further, such a process provides an optimum magma, that is, a magma having an optimum crystal solids content.

The contour ring 9, previously discussed, is particularly desirable in large crystal suspension vessels because it acts as a deflector for the supersaturated liquor coming from an evaporator thus preventing such a solution from passing directly through the annular space between cones 16 and 16a. Although in most cases such a ring is desirable, it is within the scope of my invention that such may be eliminated. The positioning of such a ring is preferably such that its outer edge is adjacent the outer edge of cone 16a of Figure 2 or the innermost edges of the plurality of withdrawal conduits indicated in Figure 1. Such positioning gives the most desirable results although, depending on the contour of the bottom head of the crystallization zone such a ring may be placed nearer the center thereof.

As previously stated the apparatus of my invention may be adapted for use with other types of crystallizers besides the Oslo type and therefore the invention is not limited by the type of crystallizer used.

Although this process and apparatus have been described and exemplified in terms of their preferred modifications, it is understood that various changes may be made without departing from the spirit or scope of the disclosure and of the claims.

I claim:

1. In a process for the production of crystalline material by supersaturating a solution thereof and contacting said supersaturated solution with already formed crystals thereby causing them to grow, the improvement which comprises removing the largest crystals produced from the bottom of the crystallization zone through a plurality of outlets symmetrically positioned in said bottom more than half the radius of said crystallization zone from the center axis thereof, passing thus removed crystals in the form of a magma in a composite stream to a separation zone and recovering crystals from said separation zone as products of the process.

2. A process for the manufacture of crystalline material which comprises evaporating a solution of a crystallizable material to a point within the metastable region, passing the thus supersaturated solution to a crystallization zone wherein it contacts crystals, causing said crystals to grow in size and the supersaturation of the solution to be reduced, removing thus formed crystals as a crystal magma through a plurality of outlets positioned in the bottom of said crystallization zone more than half the radius of said crystallization zone from the center axis thereof, passing said crystal magma from said outlets as a composite stream along with a quantity of recycle mother liquor to a separation zone, recovering crystals from said separation zone as the product of the process, and recycling at least a portion of the mother liquor separated from said crystals to the withdrawn magma as hereinbefore discussed.

3. An apparatus for the withdrawal of a magma of relatively uniform crystal size from a crystallization apparatus which comprises a plurality of outlets symmetrically positioned in the bottom of a crystallizer through which a magma of relatively uniform crystal size is withdrawn, said outlets being positioned in said bottom more than half the radius of said crystallization apparatus from the center axis thereof, convergent conduit means leading from said outlets, and outlet means from said conduit.

4. An apparatus for the withdrawal of a magma of relatively uniform crystal size from a crystallization apparatus which comprises a plurality of outlets symmetrically positioned in the bottom of a crystallizer more than half the radius of said crystallization apparatus from the center axis thereof, a contour ring in the bottom of said crystallizer for deflecting supersaturated solution introduced thereto away from said outlets, convergent conduit means leading from said outlets, and outlet means from said conduit.

5. An apparatus according to claim 4 wherein said contour ring is axially positioned with respect to said outlet means in the bottom of said crystallizer.

6. An apparatus according to claim 4 wherein the surface of said contour ring exposed to the said supersaturated solution is curved.

7. An apparatus for the withdrawal of a magma of relatively uniform crystal size from a crystallization apparatus which comprises a plurality of outlets in the bottom of a crystallizer axially positioned more than half the radius of said crystallizer from the center axis thereof, a contour ring in the bottom of said crystallizer axially positioned with respect to said outlets and within the area described by said outlets, convergent conduit means leading from said outlets, and outlet means from said conduit.

8. An apparatus for the withdrawal of a magma of relatively uniform crystal size from a crystallization apparatus, which comprises a plurality of outlets positioned in the bottom of a crystallizer evenly spaced along a circle axially positioned with respect to the bottom of said crystallizer, said circle having a radius more than half the radius of said crystallizer, tubular conduits leading from each of said outlets converging upon one another and forming one conduit, and outlet means from said one conduit.

9. An apparatus according to claim 8 wherein there is a contour ring in the bottom of said crystallizer axially positioned with respect to the outlet means therein and circumvented thereby.

10. An apparatus according to claim 9 wherein said contour ring in the bottom of said crystallizer is positioned in such a manner that its outermost edge is inscribed by a circle passing through the innermost edges of said outlets.

11. An apparatus for the withdrawal of a magma of relatively uniform crystal size from a crystallization apparatus which comprises a plurality of outlets in the bottom of a crystallizer at a distance from the center axis of said crystallizer of more than half the radius of said crystallizer and axially positioned with respect thereto, tubular conduit means leading from each of said outlets and converging upon one another, and a composite outlet means for said tubular conduit means.

12. An apparatus for the withdrawal of a magma of relatively uniform crystal size which comprises an inlet for supersaturated liquor in a crystallizer axially positioned and extending downwardly and near the bottom of the crystallizer, an annular slot in the bottom of said crystallizer more than half the radius of said crystallizer from the center axis thereof, two concentrically positioned inverted cones attached to the edges of said slot and forming an annular space therebetween, and an outlet from said annular space at the apex of the outermost cone.

13. An apparatus according to claim 12 wherein there is a contour ring in the bottom of said crystallizer axially positioned with respect to said slot and inscribed by the innermost edges thereof for deflecting the supersaturated liquor away from said slot.

RUSSELL K. SIMMS.

REFERENCES CITED

The following references are of record in the file of this patent:

UNITED STATES PATENTS

| Number | Name | Date |
|---|---|---|
| 2,164,111 | Jeremiassen | June 27, 1939 |
| 2,164,112 | Jeremiassen | June 27, 1939 |
| 2,375,922 | Jeremiassen | May 15, 1947 |

FOREIGN PATENTS

| Number | Country | Date |
|---|---|---|
| 771,004 | France | Mar. 31, 1934 |